United States Patent [19]

Meteyer

[11] Patent Number: 5,218,004

[45] Date of Patent: Jun. 8, 1993

[54] PROCESS FOR ENHANCING THE SURFACE AREA OF AN ADSORBENT COPOLYMER

[75] Inventor: Thomas E. Meteyer, Gwynedd Valley, Pa.

[73] Assignee: Rohm and Haas Company, Philadelphia, Pa.

[21] Appl. No.: 568,297

[22] Filed: Aug. 16, 1990

[51] Int. Cl.$^5$ .................................................. C08J 9/00
[52] U.S. Cl. ........................................ 521/53; 521/30; 521/31; 521/146; 521/150; 525/332.1; 525/332.2; 525/370; 525/371
[58] Field of Search ..................... 521/30, 31, 53, 150; 525/332.1, 332.2, 371, 370; 526/336

[56] References Cited

U.S. PATENT DOCUMENTS

| | | | |
|---|---|---|---|
| 4,191,813 | 3/1980 | Reed | 521/33 |
| 4,224,415 | 9/1980 | Metizner et al. | 521/38 |
| 4,263,407 | 4/1981 | Reed | 521/33 |
| 4,543,365 | 9/1985 | Itagaki et al. | 521/53 |

Primary Examiner—Fred Teskin
Attorney, Agent, or Firm—John E. Taylor, III

[57] ABSTRACT

Highly crosslinked styrenic copolymers are treated to enhance their surface area by reacting residual vinyl groups in the copolymers in the presence of water or other non-swelling liquid and a Lewis-acid catalyst at elevated temperature

17 Claims, No Drawings

PROCESS FOR ENHANCING THE SURFACE AREA OF AN ADSORBENT COPOLYMER

FIELD OF THE INVENTION

This invention relates to adsorbent polymers. It more specifically relates to enhancing the surface area of existing, crosslinked adsorbent polymers.

BACKGROUND OF THE INVENTION

The effectiveness of adsorbents generally increases as their surface area and porosity increase. Even macroporous copolymers, which are prepared with a relatively high initial porosity and surface area, show improved adsorption, especially of small molecules, when their surface area is increased.

Reed, U.S. Pat. No. 4,263,407, and Reed et al., U.S. Pat. No. 4,191,813 disclose processes for increasing the surface area and porosity of both gel and macroporous, lightly crosslinked polymeric adsorbents. These processes form macronet structures by swelling the lightly crosslinked polymer with an organic solvent that swells but does not dissolve the copolymer, and post-crosslinking the swollen polymer using a Lewis-acid catalyst. The post-crosslinking step "freezes" the swollen structure in place, so that when the solvent is removed, the polymer is supported by the additional crosslinks. These prevent the polymer from shrinking to its original, unswollen volume, and allows it to maintain a total volume approaching that of the swollen polymer. As the solvent is removed, voids remain within the swollen structure which produce the increase in porosity and surface area. This process, termed "macronetting", depends upon swelling the polymer in a solvent, and consequently it depends heavily upon the degree of crosslinking present in the starting polymer. Highly crosslinked polymers swell poorly in solvents, so the increase in surface area achievable with such polymers is severely limited, according to the Reed disclosures.

Itagaki et al., in U.S. Pat. No. 4,543,365, discloses the use of a Lewis-acid catalyst to increase the porosity of swollen copolymers having a higher degree of crosslinking, including those with up to 80% crosslinker. As with Reed, Itagaki teaches and exemplifies the use of an organic swelling agent for the copolymer.

A desirable process for enhancing the porosity of copolymers would avoid the use of an organic solvent to swell the copolymers, as such solvents add elements of toxicity and waste disposal to the process.

SUMMARY OF THE INVENTION

I have discovered a process by which the surface area and porosity of highly crosslinked aromatic copolymers may be increased significantly, which comprises treating the copolymers in the presence of a non-swelling liquid with a Lewis-acid catalyst, to post-crosslink the polymer. I have also discovered the highly crosslinked, enhanced-surface-area aromatic copolymer adsorbents which are made by this process.

DETAILED DESCRIPTION OF THE INVENTION

The highly crosslinked aromatic copolymers which may be treated by the process of the present invention to enhance their surface area include those produced from a preponderance of polyethylenically unsaturated aromatic monomers, and more preferably from at least about 80% polyethylenically unsaturated aromatic monomers. As used herein, the term "a preponderance" means greater than 50 percent by weight. Preferred polyethylenically unsaturated aromatic monomers are those in which all the unsaturated groups have approximately equal reactivity, and include polyvinylbenzenes such as divinylbenzene, trivinylbenzene and substituted divinylbenzenes and trivinylbenzenes. In addition to the polyethylenically unsaturated aromatic monomers, minor amounts of monoethylenically unsaturated monomers copolymerizable with the polyethylenically unsaturated aromatic monomers may be present, preferably at amounts less than 50% by weight of the copolymer, more preferably less than about 40%, still more preferably less than about 20%, and still more preferably less than about 10% by weight of the copolymer. The monoethylenically unsaturated monomers will frequently be impurities produced in the manufacture of the polyethylenically unsaturated monomer, as for example ethylvinylbenzene, which may be present at levels up to about 45% by weight in commercial divinylbenzene. While the preferred monoethylenically unsaturated monomers are aromatic monomers, aliphatic monomers in amounts of less than about 20% of the weight of the copolymer may be used.

Preferred copolymers are those which have been prepared as beads by suspension polymerization, and especially preferred are those which have been prepared as macroporous beads by suspension polymerization in the presence of a phase separating agent, as described by Meitzner et al., U.S. Pat. No. 4,224,415.

Pre-conditioning of the copolymer prior to treatment with the Lewis-acid catalyst is preferred. The pre-conditioning steps comprise swelling the copolymer in a swelling solvent, such as is described in the Reed patents cited above, as for example methylene dichloride or propylene dichloride, which swells but does not dissolve the copolymer. This is followed by treating the copolymer with a non-swelling liquid miscible with the swelling solvent, as for example methanol, to displace and remove the swelling solvent, and finally drying the copolymer to remove the non-swelling liquid. The dry polymer thus treated is not in a swollen state, but, while not wishing to be bound by theory, I believe this pre-conditioning treatment increases the accessibility of reactive groups to the Lewis-acid catalyst, increases the reactivity of the reactive groups, or both.

The Lewis-acid catalysts which may be employed to catalyze the post-crosslinking of the highly crosslinked copolymers include ferric halides, preferably ferric chloride; zinc halides, preferably zinc chloride; tin halides, preferably tin chloride; and aluminum chloride. The preferred concentration of Lewis-acid catalyst is from about 0.2 to about 1 mole per mole of copolymer.

The post-crosslinking reaction is preferably carried out in a medium that is essentially not a swelling solvent for the highly crosslinked copolymer, and more preferably in an aqueous medium or in a non-swelling organic liquid such as a lower alkanol; particularly preferred are water, aqueous solutions of lower alkanols including those $C_1$-$C_6$ straight-chain, branched and cyclic alcohols that form water solutions, and methanol.

Conditions preferred for reacting the copolymer in the presence of the Lewis-acid catalyst include elevated temperature, from about 25° C., more preferably from about 35° C., to the boiling point of the non-swelling liquid at the pressure selected for the reaction, and atmospheric pressure. The upper temperature limit is about 100° C. when water and atmospheric pressure are employed, although temperatures greater than 100° C. may be attained if the reaction is conducted at pressures above atmospheric. Temperatures will be lower if a lower-boiling liquid is used, as for example about 65° C. when methanol is used at atmospheric pressure, although again, higher temperatures may be used at greater than atmospheric pressure. A practical upper temperature limit is about 200° C., above which excessive degradation of the copolymer occurs. The time for reacting the copolymer in the presence of the Lewis-acid catalyst is dependent upon the temperature selected, and should be long enough to allow reaction of a significant fraction of the available, reactive groups. In general the preferred times are at least about 0.25 hour, and more preferably from about 0.25 hour to about 16 hours. Still more preferred is from about one to about eight hours, and even more preferred is from about two to about five hours. The shorter times indicated are preferably used with higher temperatures, i.e., temperatures above about 35° C.

Without wishing to be bound by theory, I believe that the enhancement of surface area observed during the process of the present invention occurs because pendant vinyl groups present in the copolymer are caused to react by the Lewis-acid catalyst, producing a novel, cyclic structure to form in the copolymer. This structure forms the voids necessary to increase the porosity and surface area of the copolymer. In support of this, the intensity of the vinyl infra-red absorption maximum is observed to decrease during reaction with the Lewis-acid catalyst.

Because pendant vinyl groups, that is, those vinyl groups which are not within the polymer backbone but are attached to it, are necessary for formation of the porous structure, the highly crosslinked, aromatic copolymers useful in the present invention are those containing unreacted, pendant vinyl groups. Such unreacted, pendant vinyl groups from the polyethylenically unsaturated aromatic monomers will be present in the copolymers described above, as these groups are never completely reacted unless special reaction conditions are deliberately chosen for complete reaction.

EXAMPLES

The following examples are intended to illustrate the invention and not to limit it except as it is limited in the claims. All proportions and percentages are by weight unless otherwise stated, and all reagents used are of good commercial quality unless otherwise stated.

Example 1

This example illustrates enhancing the surface area of a highly crosslinked copolymer of divinylbenzene by reacting it in the presence of ferric chloride. The copolymer used was suspension-polymerized copolymer beads of divinylbenzene (80%) and other, monoethylenically unsaturated, styrenic monomers which occur as impurities in 80% divinylbenzene, the major proportion of which is ethylvinylbenzene. The copolymer was made using toluene as a phase-separating agent, and the surface area of the copolymer beads prior to any surface enhancement, but subsequent to the pre-conditioning described below, was 886 $m^2/g$, according to the Micromeritics instrument determination described below.

The copolymer was pre-conditioned by swelling it in propylene dichloride at ambient temperature for 15 minutes, then soaking it in methanol at ambient temperature for 15 minutes, and finally drying the sample overnight at 60° C. under vacuum.

The pre-conditioned sample was treated according to the process of the present invention by holding it for 4.0 hours at 35° C. in an aqueous solution of ferric chloride containing 0.22 moles of ferric chloride per mole of copolymer. The sample was then dried and its surface area was determined using the Micromeritics ASAP 2400 instrument, produced by Micromeritics Instrument Corp, Norcross GA, which measures surface area to a minimum pore size of 2 nm by nitrogen desorption. The surface area of the treated copolymer was found to be 1052 $m^2/g$, a significant increase over the initial (untreated) value of 886 $m^2/g$.

Examples 2-3

These examples illustrate the beneficial effect of the pre-conditioning step upon the surface-area enhancement that results from practicing the process of the present invention. The copolymer sample used in this example was prepared similarly to that of Example 1, but had a surface area of 821 $m^2/g$ prior to pre-conditioning. Two portions of the copolymer were treated according to the process of the present invention using the procedure of Example 1; Example 2 was treated without the pre-conditioning procedure described in Example 1, and Example 3 was pre-conditioned as described in Example 1 prior to being treated. The surface area results are shown below:

| | |
|---|---|
| Untreated, non-conditioned Polymer | 821 $m^2/g$ |
| Example 2 (not pre-conditioned) | 858 $m^2/g$ |
| Example 3 (pre-conditioned) | 914 $m^2/g$ |

As may be seen, the pre-conditioning step causes a greater enhancement of the copolymer surface area when it is treated according to the process of the present invention.

Examples 4-5

These examples illustrate that another non-swelling liquid may be used in the present process; the liquid used in these examples is methanol. The copolymer is that of Example 1, and pre-conditioned as described in that example. The copolymers of Examples 4 and 5 were treated with ferric chloride (0.22 moles per mole of copolymer) in methanol for 4.0 hours at 35° C.; the copolymer of Example 5 was first treated with a 1% aqueous solution of Triton ® X-100 non-ionic surfactant to aid the methanol in wetting the copolymer. The surface-area results are shown below:

| | |
|---|---|
| Untreated Copolymer | 886 $m^2/g$ |
| Example 4 (FeCl$_3$, methanol) | 1036 $m^2/g$ |
| Example 5 (FeCl$_3$, methanol, detergent) | 1029 $m^2/g$ |

As may be seen, replacing water with methanol in the process of the present invention has little effect on the degree of surface enhancement, and no significant effect is observed when a detergent is added to assist the methanol in wetting the copolymer.

Examples 6-11

These examples illustrate the effect of reaction temperature on the surface-area enhancement that results from practicing the process of the present invention.

The copolymer is similar to that of Example 1 except that it has an initial surface area of 865 m²/g; it has been pre-conditioned as described in that example. For Examples 6-8, pre-conditioned samples of the copolymer were held in aqueous solutions of ferric chloride for 4.0 hours at the temperatures indicated in Table I; for Examples 9-11, the pre-conditioned samples were held in methanol solutions of ferric chloride for 4.0 hours at the indicated temperatures. The reaction conditions and surface-area results are shown in Table I below:

TABLE I

| Example | Liquid Medium | Temperature | Surface Area |
| --- | --- | --- | --- |
| Untreated |  |  | 865 m²/g |
| 6 | Water | 35° C. | 893 m²/g |
| 7 | Water | 50° C. | 895 m²/g |
| 8 | Water | 100° C. | 910 m²/g |
| 9 | Methanol | 35° C. | 931 m²/g |
| 10 | Methanol | 50° C. | 921 m²/g |
| 11 | Methanol | 65° C. | 921 m²/g |

Examples 12-17

These examples illustrate the effect upon the copolymer surface area of changing the concentration of the Lewis-acid catalyst. The copolymer used in these examples was that used in Examples 6-11, preconditioned as described in Example 1. The Lewis-acid catalyst concentration was either 0.22 or 0.44 moles per mole of copolymer, indicated in Table II by the notation "2X". The copolymer was treated at the indicated temperatures for 4.0 hours. The surface area of the resulting copolymer beads is shown in Table II below.

TABLE II

| Example | Lewis Acid Conc. | Temperature °C. | Surface Area m²/g |
| --- | --- | --- | --- |
| Control | None |  | 865 |
| 12 | 0.22 | 35 | 893 |
| 13 | 0.44 | 35 | 920 |
| 14 | 0.22 | 50 | 895 |
| 15 | 0.44 | 50 | 911 |
| 16 | 0.22 | 100 | 910 |
| 17 | 0.44 | 100 | 926 |

Examples 18-19

These examples illustrate the use of a different Lewis-acid catalyst in the process of the present invention. A solution of zinc chloride (0.22 moles/mole of copolymer) was used to treat the preconditioned copolymer of Example 1 for 4.0 hours at a temperature of 55° C. in water (Example 18) and in methanol (Example 19). The control was not treated with a Lewis-acid catalyst. The surface-area results are shown below:

| Control | 886 m²/g |
| --- | --- |
| Example 18 | 923 m²/g |
| Example 19 | 950 m²/g. |

I claim:

1. A process for enhancing the surface area of an adsorbent copolymer prepared by the suspension polymerization, in the presence of a phase-separating agent, of a monomer mixture containing at least about 50 weight percent polyethylenically unsaturated monomer, the process comprising reacting the adsorbent copolymer, in the presence of a non-swelling liquid, with a Lewis-acid catalyst at a temperature of at least about 25° C. for a time of at least about 0.25 hours.

2. The process of claim 1 wherein the non-swelling liquid is water.

3. The process of claim 1 wherein the non-swelling liquid is an aqueous solution of a $C_1$-$C_6$ straight-chain, branched or cyclic alcohol that forms a water solution.

4. The process of claim 3 wherein the alcohol is methanol.

5. The process of claim 3 wherein the alcohol is ethanol.

6. The process of claim 1 wherein the Lewis-acid catalyst is a ferric halide.

7. The process of claim 6 wherein the ferric halide is ferric chloride.

8. The process of claim 1 wherein the Lewis-acid catalyst is a zinc halide.

9. The process of claim 8 wherein the zinc halide is zinc chloride.

10. The process of claim 1 wherein the temperature is from about 25° C. to about 200° C.

11. The process of claim 1 wherein the temperature is from about 35° C. to about 100° C.

12. The process of claim 1 wherein the temperature is from about 35° C. to about 65° C.

13. The process of claim 1 wherein the copolymer, prior to treatment with the Lewis-acid catalyst, is pre-conditioned by swelling it with a swelling solvent for the copolymer, displacing the swelling solvent with a non-swelling liquid miscible with the swelling solvent, and removing the non-swelling liquid.

14. The process of claim 13 wherein the non-swelling liquid is removed by drying.

15. The process of claim 10 wherein the time is from about 0.25 hours to about 16 hours.

16. The process of claim 11 wherein the time is from about 1 hour to about 8 hours.

17. The process of claim 11 wherein the time is from about 2 hours to about 5 hours.

* * * * *